(12) United States Patent
Murray et al.

(10) Patent No.: US 8,515,875 B1
(45) Date of Patent: Aug. 20, 2013

(54) SYSTEMS AND METHODS FOR SPONSORSHIP OF SELECTED CAUSES

(75) Inventors: Thomas P. Murray, Solana Beach, CA (US); William A. Hurst, III, N. Tustin, CA (US); Kevin Maloney, Newport Beach, CA (US)

(73) Assignee: Cuipo, Newport Beach, CA (US)

( * ) Notice: Subject to any disclaimer, the term of this patent is extended or adjusted under 35 U.S.C. 154(b) by 0 days.

(21) Appl. No.: 13/300,246

(22) Filed: Nov. 18, 2011

Related U.S. Application Data

(60) Provisional application No. 61/415,790, filed on Nov. 19, 2010.

(51) Int. Cl.
*G06Q 99/00* (2006.01)
*G06Q 10/10* (2012.01)

(52) U.S. Cl.
CPC ..................................... *G06Q 10/10* (2013.01)
USPC ........................................ 705/329; 705/313

(58) Field of Classification Search
CPC ....................................................... G06Q 10/10
USPC ........................................ 705/315, 313, 329
See application file for complete search history.

(56) References Cited

U.S. PATENT DOCUMENTS 5,466,919 A * 11/1995 Hovakimian ................... 705/17

OTHER PUBLICATIONS

"New charity website offer 'Land Guardian' status", 4ecotips, Apr. 11, 2008, artilce at http://www.4ecotips.com/eco/article_show.php?aid=1678&id=294.*
"How to Give 3 Gifts in 1", Healthy Planet, Dec. 8, 2010, flyer at http://www.healthyplanet.org/media/51415/3%20gifts%20in%201%20flyer%20editable1.pdf.*
"Healthy Planet Guardian Help", Healthy Planet, Oct. 22, 2008, video at http://www.youtube.com/watch?v=aau_kSTJHm0 (see VideoClipart_HealthyPlanet.pdf).*
"www.healthyplanet.org: Us in 60 Secs", Healthy Planet, Aug. 28, 2009, video at http://www.youtube.com/watch?v=tTK6lhsQPxI&feature=related (see VideoClipart_HealthyPlanet.pdf).*
"Adopt Land Tutorial (2mins) www.healthyplanet.org", Healthy Planet, Sep. 15, 2009, video at http://www.youtube.com/watch?v=Xo0PaBKVKDg (see VideoClipart_HealthyPlanet.pdf).*
"100 people x $100 Dollars = $10,000 = Land for Mercy's Village" ("Mercy's Village"), http://www.mercysvillage.org/donate/100for100, archive from Jun. 20, 2010, Mercy's Village International, 2 pgs.*
"Healthy Planet website launched" ("Healthy Planet"), http://www.kcl.ac.uk/news/wmprint.php?news_id=776&year=2008, Apr. 22, 2008, King's College London, 3 pgs.*

* cited by examiner

*Primary Examiner* — Ryan Zeender
*Assistant Examiner* — Hunter Wilder
(74) *Attorney, Agent, or Firm* — Kyle M. Pendergrass

(57) ABSTRACT

Systems and methods for sponsoring an area of land are disclosed. Certain systems and methods may cause the display of areas of land that are available for sponsorship, receiving input identifying an area of land to sponsor, processing sponsorship of the identified area, and generating an interface for displaying the sponsored area.

20 Claims, 12 Drawing Sheets

SYSTEMS AND METHODS FOR SPONSORSHIP OF SELECTED CAUSES

CROSS-REFERENCE TO RELATED APPLICATIONS

This application claims priority under 35 U.S.C. §119(e) to U.S. Provisional Patent Application Ser. No. 61/415,790, filed Nov. 19, 2010, entitled SYSTEMS AND METHODS FOR SPONSORSHIP OF END USER SELECTED GEOGRAPHIC AREAS, the content of which is hereby incorporated by reference herein in its entirety for all purposes.

FIELD OF THE INVENTION

The invention relates generally to systems and methods regarding charitable giving and social enterprising. In particular, features of the invention relate to sponsorship of land by way of donation or purchase of a product/service.

BACKGROUND OF THE INVENTION

The field of charitable giving is widely practiced. Specifically, modern global citizens have become more aware of the impact their choices make on the environment, and the health and well-being of others. Similarly, corporations have found that lowering their carbon and social footprints can be a significant market differentiator. Charitable giving is one way to support green and social initiatives while lowering such footprints.

For example, there are some organizations that take donations to sponsor advocacy, conservation, or clean-up efforts for land, while the ownership of the land remains with another individual or organization. That owner may ultimately decide to develop or sell the land that sponsors have devoted time and resources to protecting. Furthermore, the efforts tend to focus only on the land and not the people who live on or near the area. Previous practices do not provide a way for sponsoring physical locations in a tangible way that allows the sponsor to see the precise locations available for sponsorship, select a specific area, and ensure the land will be preserved on their behalf using their sponsorship funds.

SUMMARY OF THE INVENTION

In accordance with the present invention, a computer-implemented method, a system and a computer program product comprising a computer usable medium having a computer readable program code embodied therein that is adapted to be executed to implement a method for sponsoring an area of land are described. The method, system and computer program product may provide for storing, at a database, information identifying a plurality of areas of land, a first indication reflecting that a first area of land is sponsored, a second indication that a second area of land is unsponsored, and a third indication that a third area of land is unsponsored. The method, system and computer program product may further provide for receiving input, from a remote computing device, identifying the second area of land, and modifying the second indication to reflect that the second area of land is sponsored based on the input.

The method, system and computer program product may also provide for storing, prior to receiving input identifying the second area of land, data specifying an activation code associated with a product or service and with the second area of land. The received input may specify the activation code, and may be received from a point-of-sale device or a purchaser of the product or service.

The method, system and computer program product may further provide for causing, prior to receiving input identifying the second area of land, the remote computing device to display an initial map showing the plurality of areas of land, the first indication reflecting that the first area of land is sponsored, the second indication that the second area of land is unsponsored, and the third indication that the third area of land is unsponsored. After modifying the second indication to reflect that the second area of land is sponsored, the remote computing device may display an updated map showing the plurality of areas of land, the first indication reflecting that the first area of land is sponsored, the second indication that the second area of land is sponsored, and the third indication that the third area of land is unsponsored.

BRIEF DESCRIPTION OF THE DRAWINGS

The present application may be more fully appreciated in connection with the following detailed description taken in conjunction with the accompanying drawings.

DETAILED DESCRIPTION OF THE INVENTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that any aspect disclosed may be implemented independently of any other aspects and that two or more of these aspects may be combined in various ways. For example, a system may be implemented or a method may be practiced using any number of the aspects set forth herein.

Aspects of the invention may feature systems and methods that allow a user to view, select, and sponsor a portion of land for conservation. It should be noted that a "user" includes individuals, institutions, and other legal entities. One innovative aspect of the subject matter described in this disclosure can be implemented in a system and method for sponsoring an area of land, displaying areas available for sponsorship, receiving input identifying an area to sponsor, processing sponsorship of the identified area, and generating an interface for displaying the sponsored area.

Other aspects of the invention may feature innovative, easy-to-use social networking approaches to create an on-line community of users interested in green and other social causes. Users may to communicate through Facebook, Twitter, mobile phone applications, and a variety of other social media platforms. Users may further access an interactive website to learn more about the causes through video content, blog posts, user-generated content, interactive tools and games. The website may provide individuals, families, and companies the opportunity to support various causes (e.g., conserve endangered rainforests through land sponsorship) or otherwise make pledges associated with those causes and track progress related to those pledges. Users may also have access to a variety of promotions associated with products and services based on their membership to the online community and support for particular causes, and may identify products and services of interest based on targeted advertisements tailored to user behavior, preferences or other information.

While certain embodiments described herein refer to sponsorship of land through individual and corporate donations and purchases of products or services, it will be appreciated that sponsorship may extend to any sort of cause, including causes typically undertaken by charities, governments and social enterprises.

For a better understanding of certain aspects and features of the present invention, attention is drawn to the following Overview.

Overview

Figure 1:
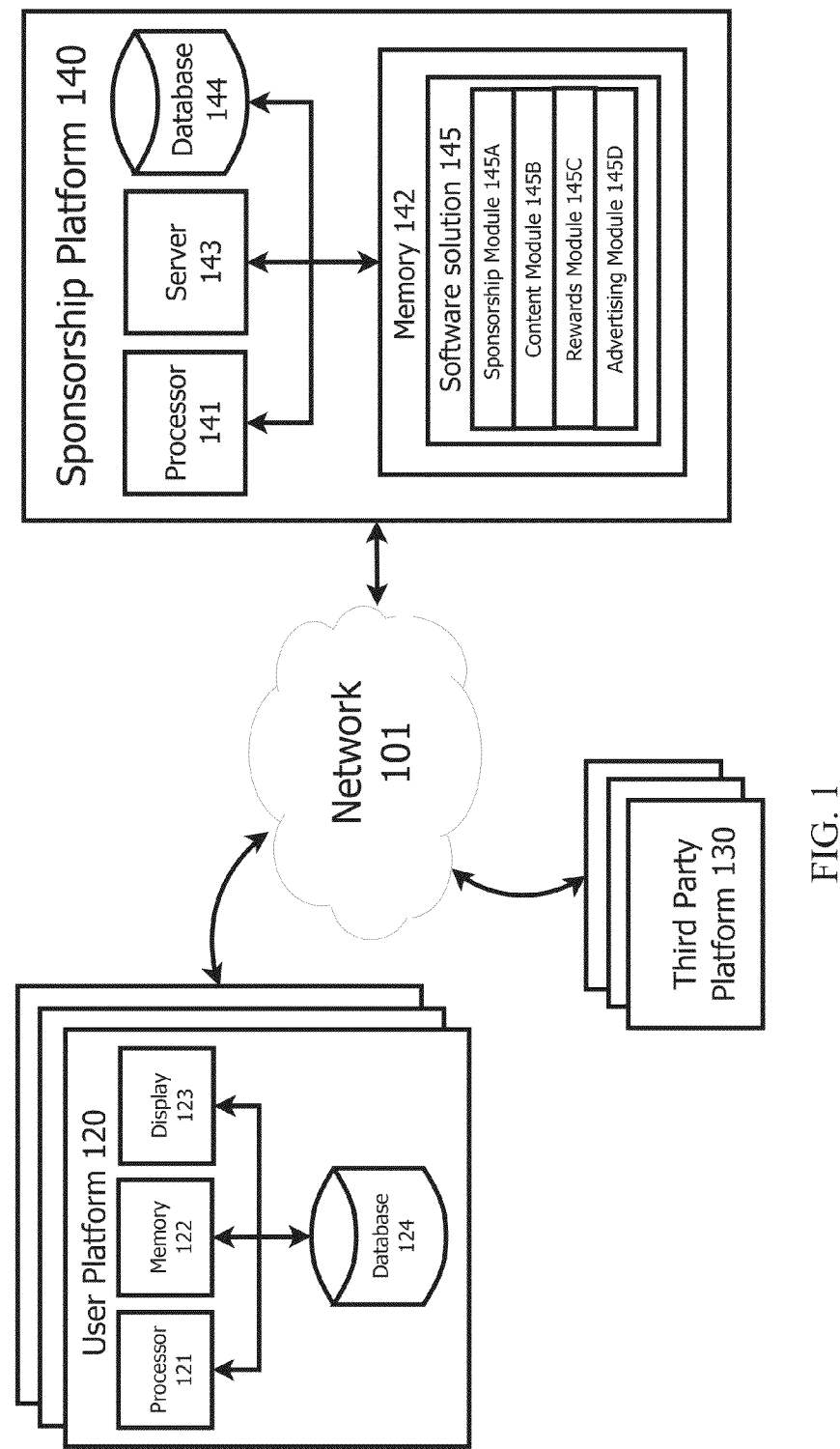
FIG. 1 shows a block diagram depicting a networked sponsorship system for facilitating sponsorship activity by a user in accordance with at least one embodiment of the invention.

Aspects and features of the invention are designed to operate on computer systems, servers, and/or other like devices. While the details of the embodiments of the invention may vary and still be within the scope of the claimed invention, FIG. 1 shows a block diagram illustrating one implementation of a system for sponsorship of user selected geographic areas. One of skill in the art will appreciate that the system for sponsorship of user selected geographic areas is not intended to suggest any limitation as to the scope of use or functionality of the invention. Neither should the system for sponsorship of user selected geographic areas be interpreted as having any dependency or requirement relating to any one or combination of components illustrated in FIG. 1.

The system depicted in FIG. 1 may take various configurations within the scope and spirit of the invention. For example, the disclosed system may be configured to include a network 101, one or more user platforms 120, one or more third party platforms 130, and one or more sponsorship platforms 140. The user platform 120, third party platform 130 and the sponsorship platform 140 may communicate with each other via the network 101 using known methods of exchanging information.

One of skill in the art will appreciate that some or all of these platforms or their components may be omitted, combined, reallocated or rearranged. The term "platform" as used herein may refer to any or both of distributed components across multiple locations and centralized components in one location. A platform may include components that are hosted by or services that are offered by other parties than those directly associated with each platform (e.g., an agent of the parties directly associated with each platform).

Network 101

The network 101 may be any suitable type of network. The network 101 may be configured to provide communication links among the various platforms 120-140. Examples of communication links includes the Internet, private networks, local area networks (e.g., LAN, WiLAN, Wi-Fi, Bluetooth), cellular or other over-the-air wireless carrier interfaces, and other wired and wireless communication pathways.

As those skilled in the art will appreciate, various intermediary network routing and other elements between the network 101 and the platforms depicted in FIG. 1 have been omitted for the sake of simplicity. Such intermediary elements may include, for example, the public switched telephone network (PSTN), gateways or other server devices, and other network infrastructure provided by Internet services providers (ISPs).

User Platform 120

The user platform 120 may be used by a user (e.g., an individual sponsor or corporate sponsor), and may include any suitable computing device or combination of computing devices. For example, the user platform 120 may be any of numerous general purpose or special purpose computing system environments or configurations. Examples of well-known computing devices, systems, environments, and/or configurations that may be suitable for use with the implementations include, but are not limited to, personal computers, server computers, hand-held or laptop devices, multiprocessor systems, microprocessor-based systems, programmable consumer electronics, network PCs, mini-computers, mainframe computers, distributed computing environments that include any of the above systems or devices, and the like. Accordingly, one or more aspects taught herein may be incorporated into a phone (e.g., a cellular phone or smart phone), a computer (e.g., a laptop or mini laptop), a portable communication device (e.g., "tablet" computing devices), a global positioning system device, a point of sale or other kiosk device, or any other suitable device that is configured to communicate via a wireless or wired medium. One or more aspects taught herein may also be incorporated into user input devices (e.g., keyboard, mouse, touch screen, speech recognition) or output devices (e.g., visual outputs, audio outputs).

As shown, the user platform 120 may include various components, including a database 124, a user display 123, a processor 121, memory 122 storing software, and/or a web browser (not shown). One of skill in the art will appreciate that the user platform 120 may include additional components not shown, and may include only a subset of the components shown in FIG. 1.

Third Party Platform 130

The third party platform 130 may refer to a number of systems or services that interact with the sponsorship platform 140, the user platform 120, and other third party platforms 130. The third party platform 130 may include features managed by corporations and other entities affiliated with sponsored areas, advertisements, social media services (e.g., Facebook, Twitter), content providers (e.g., Google Maps, news sources, search engines, Wikipedia, blogs), payment processing services, and point-of-sale locations (e.g., a user may purchase an item, and that user may receive instructions for activating a sponsorship or selecting which geographic area to sponsor, or the purchase may initiate the activation of a sponsorship).

The third party platform 130 may include various components, including a database, a display, a processor, memory storing executable software, and/or a web server for hosting a website (none shown).

Sponsorship Platform 140

The sponsorship platform 140 is shown to include a processor 141, memory 142, a server 143, and a database 144. The database 144 is described herein in several implementations as a hard disk drive for convenience, but this is certainly not required, and one of ordinary skill in the art will recognize that other storage media may be utilized without departing from the scope of the invention. In addition, one of ordinary skill in the art will recognize thon the database 144, which is depicted for convenience as a single storage device, may be realized by multiple (e.g., distributed) storage devices. The database 144 may store data in a fixed file format, such as XML, comma separated values, tab separated values, or fixed length fields.

The database 144 may receive, store and send, among other data, data related to one or more user accounts associated with the user device platform 140 (e.g., name, address, payment information, sponsorship history, purchase history). The database 144 may also receive, store and send data related to one or more sponsorship accounts associated with the sponsorship platform 140 (e.g., geographic areas that are sponsored or have yet to be sponsored, sponsor information). Such data is described in further detail below.

The processor 141 may be coupled to various components, including the database 144 and memory 142 (e.g., RAM, ROM). The processor 141 may be configured to execute instructions embodied in a software solution 145. As shown, the software solution 145 includes a sponsorship module 145A, a content module 145B, a rewards module 145C, and an advertising module 145D, that are each implemented in software. The software solution 145 may be executed from the memory 142.

One of skill in the art will appreciate that the software solution 145 may be configured to operate on personal computers (e.g., handheld, notebook or desktop), servers (e.g., a single server configuration or a multiple server configuration), or any device capable of processing instructions embodied in executable code. Moreover, one of ordinary skill in the art will recognize that alternative embodiments, which implement one or more components of the software solution 145 in hardware, are well within the scope of the invention.

In accordance with certain aspects of the invention, the sponsorship platform 140 may be configured to receive data from, send data to, and otherwise interact with any of the other platforms 120-130. For example, the sponsorship platform 140 may be configured to interact with the user platform 120 and/or the third party platform 130 to carry out certain functionality described herein, including functionality related to identifying and tracking sponsorship data relating to a particular sponsored area, a user sponsoring that area and/or a product/service associated with that area. Particularly, the sponsorship platform 140 may interact with the user platform 120 to receive, analyze and process information from a user. Such information may include: selections regarding an area a user wishes to sponsor; activation information regarding an area a corporation has pledged to sponsor upon such activation following the purchase of goods or services by an individual; user profile information; payment information; or other information. The sponsorship platform 140 may similarly receive, analyze and process information from a third party. Such information may include: advertisements; information regarding purchases of goods or services associated with sponsorship of an area; content information; or other information.

The sponsorship platform 140 may be configured to provide information, to the user platform 120, regarding sponsorship areas (e.g., including indications of sponsored and non-sponsored areas, information regarding sponsors, content information regarding certain areas), or information regarding advertisements (e.g., targeted advertisements based on user data or information provided to/received from a user). The user platform 120 may then cause that received information to be rendered on a user display 123 (e.g., as an interactive webpage, image, video or text), or otherwise provided to the user (e.g., as audio).

Attention is now drawn to modules 145A-D of the software solution 145 at the sponsorship module 140. Modules 145A-D operate in concert with each other to perform certain functions of the software solution 145, and each module 145A-D is associated with one or more functions of the invention as described below. One of skill in the art will appreciate the various ways in which such functionality can be embodied in source code, or otherwise, that provides for carrying out the functionality in the inventive systems and methods.

Sponsorship Module 145A

Module 145A may be configured to carry out aspects associated with processing, storing and modifying sponsorship data. The sponsorship data may be received from or sent to the user platform 120 and/or the third party platform 130. Sponsorship data may include information specifying particular causes (e.g., areas of land) that have been sponsored or can be sponsored, information regarding sponsors, information regarding goods or services associated with causes, user profile information, payment information, and other information. Module 145A may work in concert with other modules and components to carry out the operations of creating and managing user profiles, storing and updating data regarding sponsorship areas, and providing sponsorship information to users and third parties.

In several implementations, the sponsorship module 145A may cause the presentation—e.g., at a user display 123—of square meters of land that have been sponsored and/or that are available for sponsorship. The sponsorship module 145A may be further configured to update the sponsorship information, and cause the presentation of the updated sponsorship information.

Figure 2:
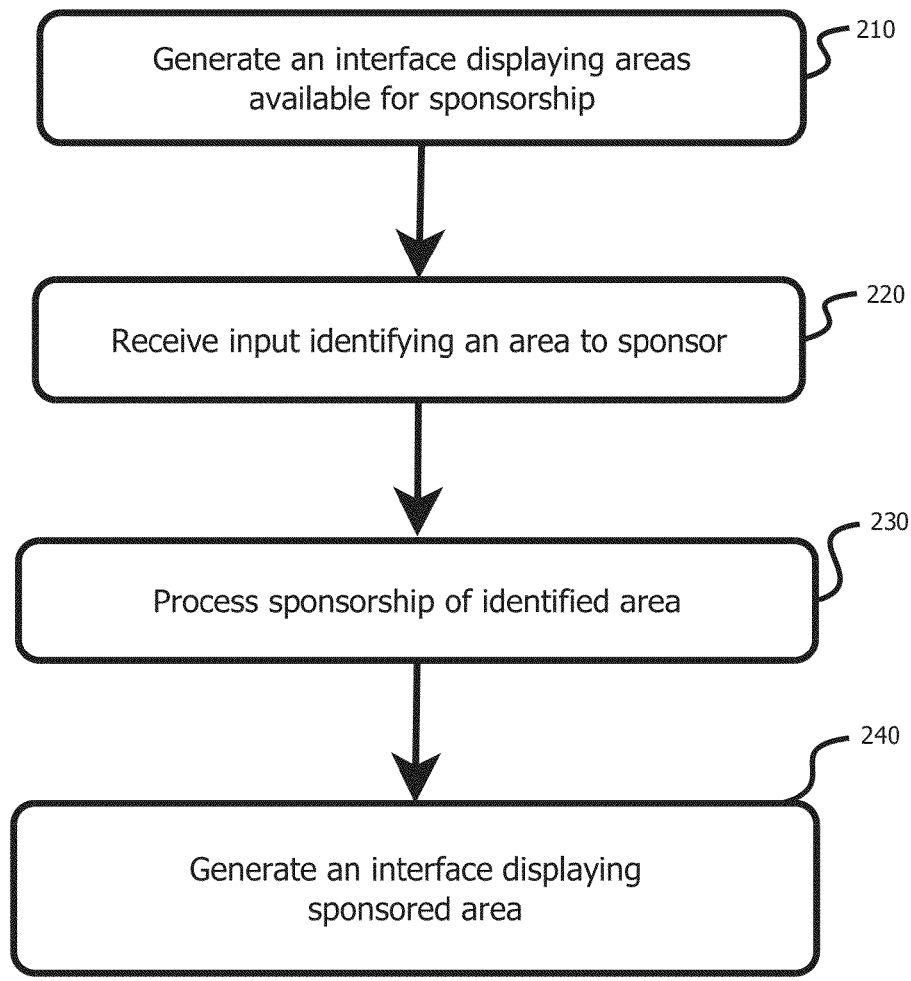
FIG. 2 illustrates a process flow diagram detailing a process for acquiring sponsorship data from a user in accordance with at least one embodiment of the invention.

Sponsorship of a cause may be provided in the inventive system using any of various processes understood by one of skill in the art based on the disclosure herein. For example, FIG. 2 depicts a process for sponsoring a geographic area. At step 210, the sponsorship module 145A may access and process sponsorship data and/or other information to generate an interface for providing information and receiving input regarding areas of land that are available for sponsorship by a user. The interface, which may be rendered and displayed at the user display 123, may be generated by analyzing available data to identify sponsorship areas and conditions that affect whether a user can sponsor an area (e.g., payment or purchase requirements, limitations placed on particular users based on user profile data, filters applied by a user or third party). Information used to generate an interface may include any data or information available through any module described herein or from any components on any platform.

In one embodiment, the interface may utilize an interactive map to indicate which users have sponsored which geographic areas, and which geographic areas have not been sponsored. Identification of unsponsored land may include identification of a desired number of sponsors for that land and/or the cost of the sponsoring the land. One skilled in the art will appreciate that the information provided by the interface may vary depending on the sponsor (e.g., corporate or individual), the type of areas (e.g., individual parcels of land or grouped parcels of land relating to corporate preserves), and/or the manner of sponsorship (e.g., whether sponsored through donation or purchase of a product/service). Furthermore, the information provided by the interface may vary depending on the particular nature of the cause (e.g., collecting funds, preserving land, providing livestock, advancing loans, distributing food).

At step 220, the sponsorship module 145A may receive, from the user platform 120, input identifying an area a user wishes to sponsor. Information provided by a user at the user platform 120 may include selection of an area to sponsor, type of sponsorship (e.g., donation, gift, corporate-sponsored product/service purchase), payment information (e.g., credit card information, check processing information, single or recurring payment, redemption of a reward), and a sponsorship category (e.g., reforestation, protection of animals). Any information provided by a user may be stored on the database 144. Information may also be received from third party platforms 130.

At step 230, the sponsorship module 145A may process the information transmitted from the user platform 130. Processing of information may include authentication (e.g., of user profile information, payment or redemption information) and verification (e.g., that a selected parcel of land is available). Processing may also include storage and updating of data regarding sponsored and unsponsored areas, data regarding user profiles, and data regarding sponsorship statistics. In particular, the sponsorship module 145A may update a user's profile to reflect the selected area upon a determination that a payment was authorized. Similarly, the sponsorship module 145A may update a data related to sponsored areas to reflect that the selected area is sponsored by the user.

At step 240, the sponsorship module 145A may generate an interface for displaying a pictorial representation of the newly-sponsored, previously-sponsored and non-sponsored areas. This representation may also include the identification of the users sponsoring those areas (e.g., pictures or names of the users, links/pictures/names from the users' social network accounts, advertisements for corporate sponsors). One skilled in the art will appreciate that the display of a sponsored area and associated sponsor may be represented in a number of ways depending on the particular type of sponsorship obtained. For example, the sponsorship module 145A may provide a webpage (e.g., managed by the sponsorship platform 140 or managed by a third party hosting service) for displaying an interactive map that shows an avatar, icon, photo, logo, and/or demarked area of land).

Several third party services may be utilized to enhance the visual representation of the interface at a user display 123, including satellite imaging services (e.g., provided by Google Maps). After the user becomes a sponsor, the sponsorship module 145A may permit the user to interact with other sponsors and adjacent sponsorship areas, may provide content like targeted educational materials, and may also allow the sponsor to select funded activities for that sponsor's land (e.g., research, reforestation, installation of infrastructure).

Content Module 145B

Figure 3:
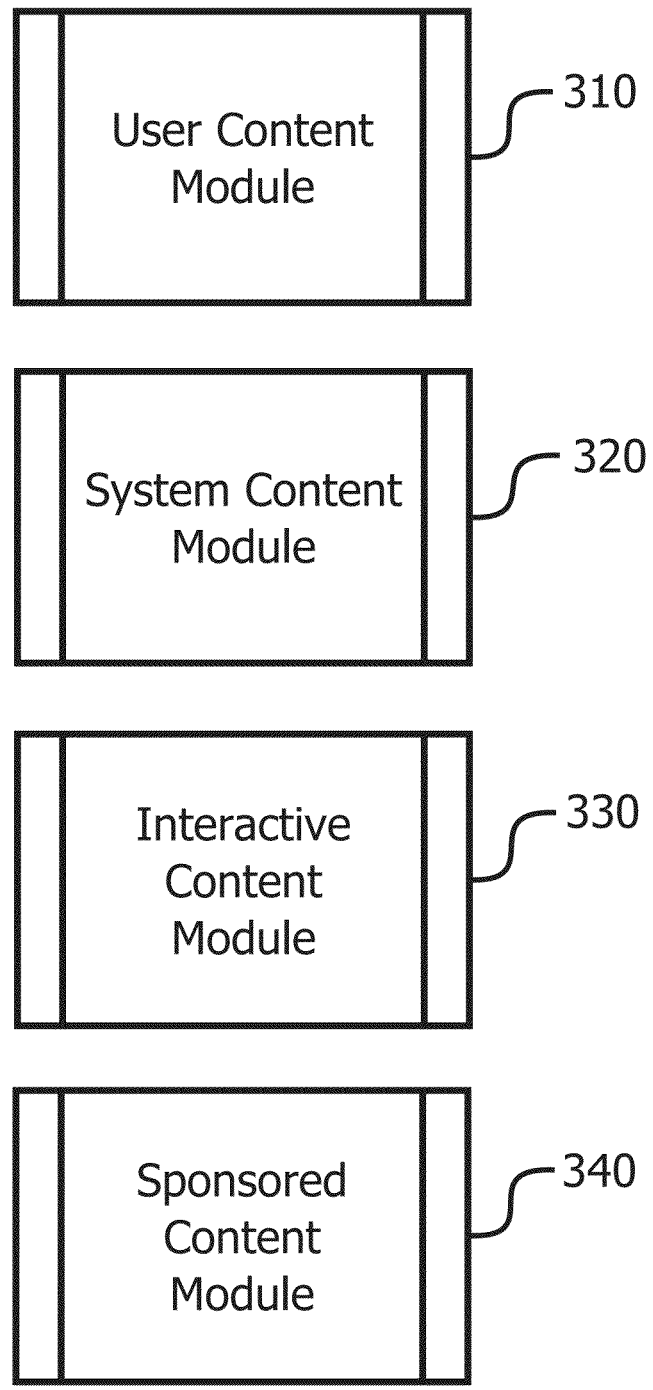
FIG. 3 illustrates various sub-modules related to a software solution for at least one embodiment of the invention.

FIG. 3 depicts a block diagram illustrating a plurality of content sub-modules relating to the content module 145B.

A user content module 310 may receive, store, and present content generated by users at the user platform 120 (e.g., blog posts, videos, video blogs, documents, music).

A system content module 320 may receive, store, and present content generated by the sponsorship platform 110 (e.g., educational materials, documents, videos). FIGS. 8 and 10-14 (described later) may be included in an implementation of a system content module 320.

An interactive content module 330 may receive, store, and present interactive multi-media content (e.g., games, discussion groups, chat rooms). The interactive content module 330 may be configured to provide interactive content hosted by the sponsorship platform 140, a third party platform 130 or a user platform 120. The interactive content module 330 may be further configured to combine interactive content hosted by the platforms 120-140.

A sponsored content module 340 may receive, store, and present content from corporate sponsors (e.g., advertisements, infomercials, educational marketing).

Attention is now returned to FIG. 1 and the content module 145B, which may call any of the sub-modules 310-340 of FIG. 3 to select and present multi-media content to a user at a user platform 120. The content presented may be in a number of formats (e.g., games, videos, images, text, sounds), and may be interactive or simply informative. In one embodiment, the content information may be interactive, such as a game or a quiz that encourage users to interact with corporate sponsors. The interactive content may allow users to communicate with other users through forums or comments and may be integrated with social media sites (e.g., Facebook, Twitter).

In another embodiment, the content module 145B may provide users with interactive campaign games associated with the user's sponsored area and surrounding areas, including a cause-and-effect style of game where activities on neighboring land, social issues, political issues and climate affect the outcome of the game, and where a participating user may pursue different objectives based on those issues.

Figure 4:
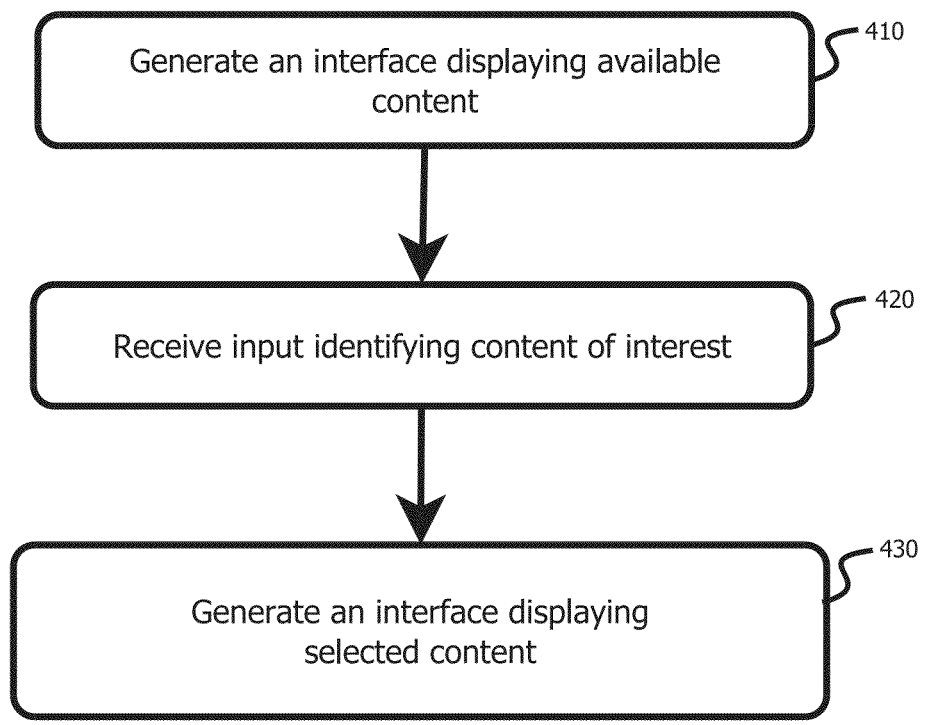
FIG. 4 illustrates a process flow diagram detailing a process for displaying user selectable content in accordance with at least one embodiment of the invention.

Content may be made available to a user using various systems and methods. For example, FIG. 4 depicts a process for selectively presenting content to a user. At step 410, the content module 145B may generate an interface for displaying available content to a user. The interface may be generated using data stored on the database 144 or received from a user or a third party. Displayed content may include: banners, games, and news articles on a sidebar; may include information relating to a user's sponsorship activities; or may include a listing of categories of content available to a user (e.g., educational information, games, listing of related organizations).

At step 420, the content module 145B may determine what content to display—e.g., based on input received from the user identifying content of interest, information received from a third party, or analysis using data saved on the database 144. A user may select content by clicking on a map, selecting menu options, typing in a description of interest, or other technique for selecting content. The user may also modify filters or other settings which a user desires to be available on the interface—e.g., settings like frequency of updates, sponsors to display, causes to display, social media content to display.

At step 430, the content module 145B may cause the display of the selected content on the user display 123.

Rewards Module 145C

Attention is returned to FIG. 1, which depicts a rewards module 145C. Module 145C may be configured to identify and present rewards to a user. The rewards, for example, may be provided for users who participate in sponsorship, complete activities, watch an advertisement, complete a survey, or pledge to perform specific actions relating to or to furthering a cause. A reward may take the form of a virtual certificate that recognizes a user's deeds in the user's profile or a public forum, or may provide a virtual item (e.g., profile badges that may be displayed on a user profile). Alternatively, a reward may provide access to benefits offered by a commercial sponsor (e.g., a discount related to a product/service, free products/services, sponsorship by the commercial sponsor of a cause in the name of the user) and may be presented as a coupon or code, or may allow for a user to engage in decision-making processes associated with a sponsored area or other campaigns (e.g., which research project to conduct on sponsored land, where to invest resources, who to elect or hire to a position within an organization supporting sponsorship of causes). One of skill in the art will appreciate alternative rewards.

The rewards module 145C may store rewards information (e.g., type of reward, visual display of reward, constraints on obtaining a reward) on the database 144 of the sponsorship platform 140, or may retrieve reward information from any other platform. The stored or retrieved data may be used to recognize when a reward may be offered to a user. The stored data may further specify prior rewards earned by user. Rewards may be displayed on private, semi-public, and public webpages or social networking sites like Facebook.

Figure 5:
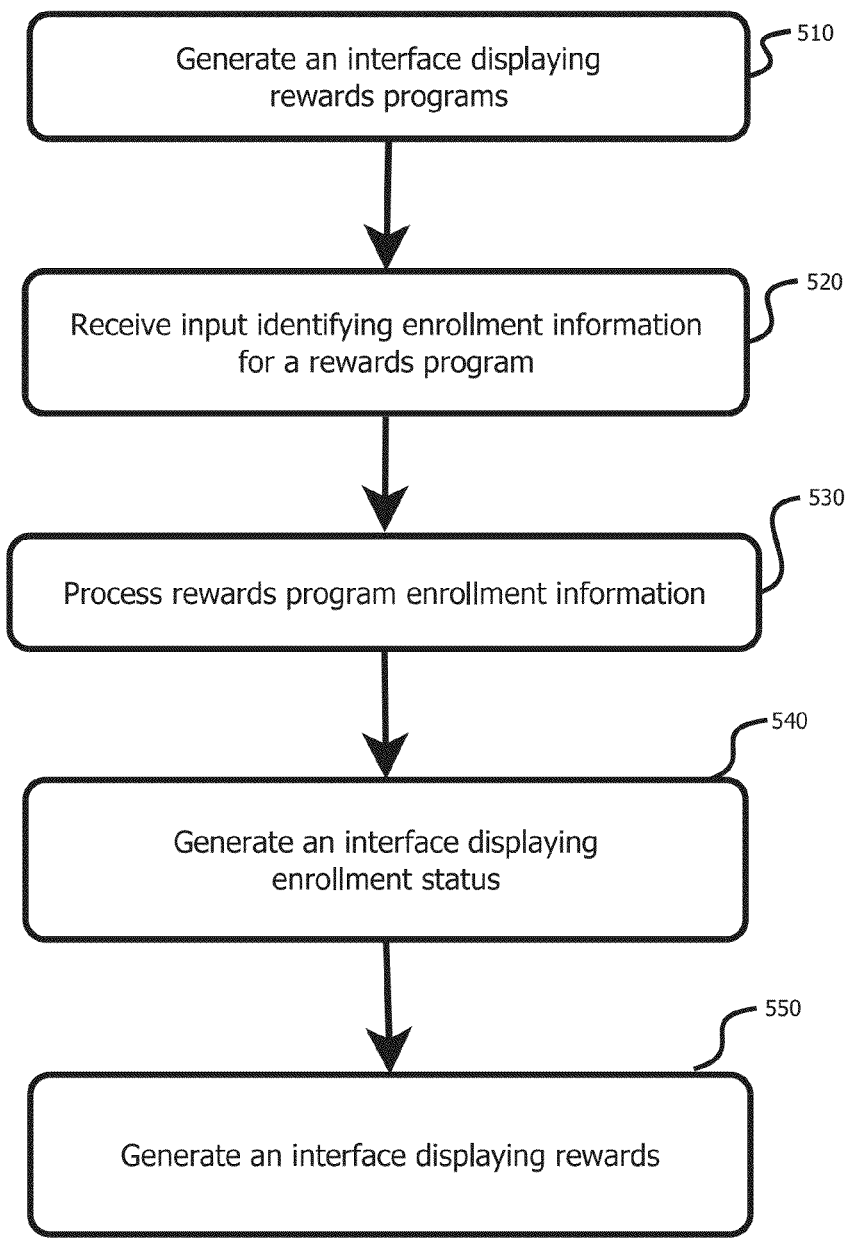
FIG. 5 illustrates a process flow diagram detailing a process for enrolling a user in a rewards program in accordance with at least one embodiment of the invention.

Attention is now turned to FIG. 5 which depicts a process of enrolling in a rewards program associated with a sponsorship entity. At step 510, the rewards module 145C may generate an interface for displaying the availability of rewards programs. All or a selection of available rewards programs may be presented to a user. Each rewards program may be accompanied by a description of the program, a breakdown of rewards available to a user, and the requirement for obtaining a reward.

At step 520, the rewards module 145C may receive input identifying enrollment information for a particular rewards program. Enrollment information collected may include username, location, sponsorship activity, preferred reward type. Such information may be obtained from a user at a user platform 120, or through social media platforms (e.g., Facebook, Twitter).

At step 530, the rewards module 145C may process enrollment information. Here, the rewards module 145C may determine whether the user is authorized to enroll in particular rewards programs. Many rewards programs may not have difficult prerequisites; however, some rewards programs may wish to limit access by requiring certain constraints. Once a user becomes enrolled in a particular rewards program, data is stored at the sponsorship platform 140 and the rewards program may then be accessible to a user through any previously-disclosed interface.

At step 540, the rewards module 145C may generate an interface for displaying enrollment status. The rewards module 145C may communicate with the sponsorship platform 140 and the database 144 to store and/or update enrollment status for a particular rewards program and a particular user (e.g., "Enrolled and Active," "Enrolled," "Enrolled but Inactive," "Not Enrolled"). In one embodiment, the rewards module 145C may periodically check a user's stored enrollment against the user's activity to determine whether the enrollment status needs to be updated—e.g., if there was no activity for over a month, a user's enrollment in a rewards program may be cancelled.

At step 550, the rewards module 145C may generate an interface for displaying rewards. The interface may be part of or independent of any other interface described herein. One skilled in the art will appreciate that the appearance and format of such an interface may vary greatly depending on a particular rewards program presented. The interface may utilize and/or analyze any data available to platforms 120-140 in order to generate and organize the appearance of the interface, including data specifying a user's preferred settings or a third party's preferences regarding presentation of information.

Advertising Module 145D

Attention is returned to FIG. 1, which depicts an advertising module 145D. Module 145D may be configured to exchange advertisements and other data between the sponsorship platform 140, the user platform 120, and a third party platform 130. Advertisements may include targeted ads based on sponsorship or user profile data, and ads associated with land sponsored by corporations. Targeted ads may be placed based on analysis of data from a user profile. In one advantageous implementation—e.g., shown in FIG. 11 (described later)—a corporation may sponsor a preserve, and the corporation's branding or other information may be presented to any user who views the corporation's sponsored area or a nearby sponsored area.

The advertising module 145D may be configured to select and present advertisements based on a user's behavior in relation to the sponsorship platform 140. For example, the advertising module 145D may be configured to select and present advertisements based on a user's sponsorship area, sponsorship history, or information the user accessed from the sponsorship platform 140.

Figure 6:
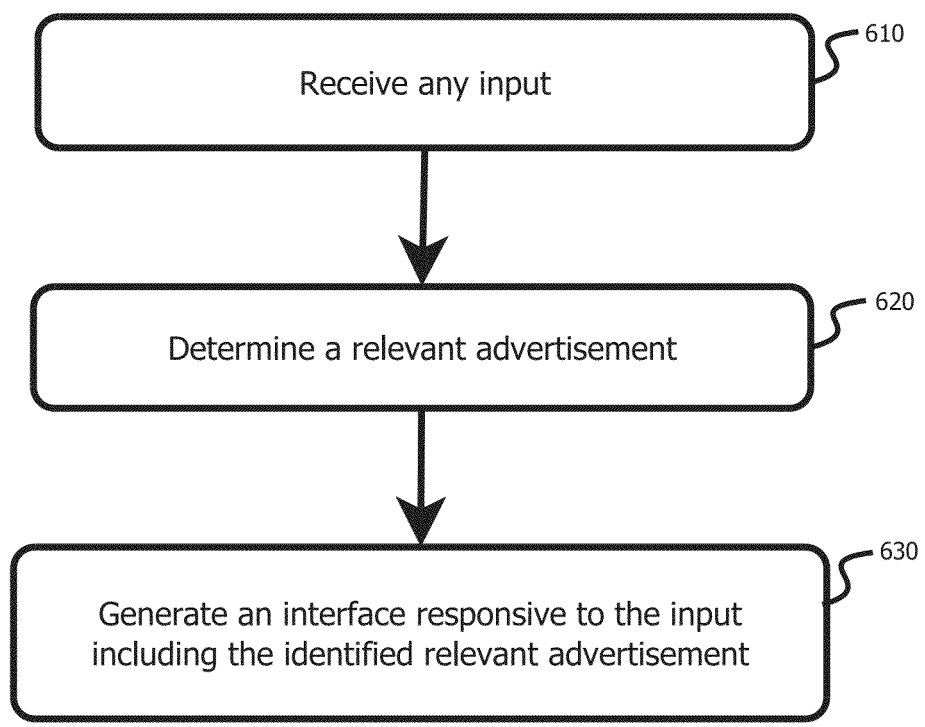
FIG. 6 illustrates a process flow diagram detailing a process for determining relevant advertisements to present to a user in accordance with at least one embodiment of the invention.

Attention is now turned to FIG. 6, which depicts a process for identifying an advertisement to present. At step 610, the advertising module 145D may receive data of some sort. Data may be extracted from user profile data stored on the database 144, or received from the user platform 120 or from third party platforms 130 (e.g., Facebook, Twitter). The data may indicate user preferences, or may indicated user selections or user interactions with respect to a webpage. Alternatively, the data may describe a user's on-line behavior (e.g., tracked by cookies on the user's computer or some other tracking technology). An advertisement may be selected or generated based on the received data at step 620.

Once an advertisement has been determined to be relevant to a user, the advertisement may be generated and presented to the user via an interface at step 630. Advertisements may take the form of text, banner ads, interactive banners, and interactive ads.

Figure 7:
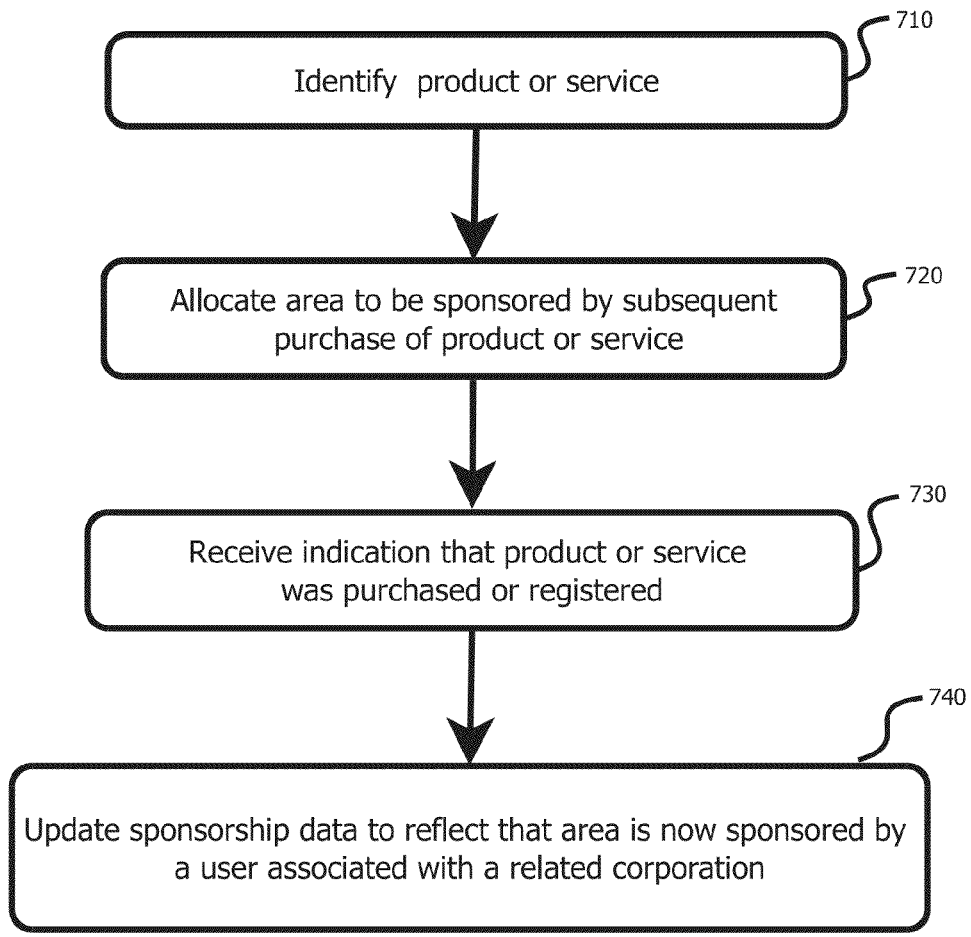
FIG. 7 illustrates a process flow diagram detailing a process for affiliating a product/service with a sponsorship that is activated upon purchase of the product/service or registration of the purchase in accordance with at least one embodiment of the invention.

Attention is now turned to FIG. 7 which depicts a process for affiliating a product/service with a sponsorship that is activated upon purchase of the product/service or registration of the purchase.

At step 710, the sponsorship platform 140 may associate a product/service to the sponsorship of a cause (e.g., a set-aside or to-be-determined area of land). The association between the product/service and the particular sponsorship may be stored on the database 144 at the sponsorship platform 140. Stored association data may include an indication that purchase of the product/service, or registration of the purchase, will result in sponsorship of the area by the purchaser or the supplier of the purchased product/service.

For example, Starbucks may indicate that each cup of coffee sold or each use of a coupon will result in the sponsoring of an area identified by Starbucks or identified by the purchaser. Starbucks or the sponsorship platform 140 may assign a registration number to each cup of coffee that can be used to identify a sponsored area following a sale of a cup of coffee. At step 720, the sponsorship platform 140 may allocate sufficient area to be sponsored by the subsequent purchase of a product/service. Allocation may be done by a corporation pre-purchasing the sponsored areas needed, or the sponsorship platform 140 apportioning the sponsored space as needed and at any time.

At step 730, the sponsorship platform 140 receives an indication that a product/service affiliated with a corporation has been purchased or registered. Data may be transmitted from a user device platform 120 or a third party platform 130 to the sponsorship platform 140 to verify that a customer has purchased or used a product/service associated with sponsorship of an area. In one embodiment, a user may input a registration code (e.g., promotional code on a receipt, bar code on label or other identifying information) at a third-party webpage or a web interface provided by the sponsorship platform 140. The input of the registration code may be carried out using various techniques, including character entry using a keyboard, or taking a photograph or otherwise scanning a bar code, image or text on a receipt, label or product. One of skill in the art will appreciate that this type of input can be used for donations and gifts regarding a cause in addition to registration of a purchase—e.g., a phone can scan a bar code, image or text at a point-of-sale or other location, in a catalog, or on a webpage, and send it to the sponsorship platform 140 for processing.

In some embodiments, the user may identify an area to sponsor, or may be automatically assigned an area based on the registration code. In another embodiment, data may be sent from a point-of-sale device associated with the purchased product/service to the sponsorship platform 140 to indicate that a purchase associated with sponsorship of an area has been transacted. Such data may include a registration code or other information that is used by the sponsorship platform 140 to identify a sponsored area.

At step 740, the sponsorship platform 140 may update sponsorship data to reflect that an area is now sponsored by a user who purchased the product/service and/or the corporation who supplied the product/service. Data may be stored and updated on the database 144 at the sponsorship platform 140. For example, data may be updated regarding the area sponsored, any remaining non-sponsored areas, the user, and the value of the sponsorship.

Other Features of the Invention

Various implementations of the invention relate to a social network-based, eco-awareness web portal that allows users to support a cause (e.g., sponsor a protected rainforest), share details with Facebook friends, influence corporate involvement, and access a wealth of top-quality media content, games, and unique interactive features. These and other features are described in more detail below.

Sponsorship by Donation or Gift

Figure 8:
FIG. 8 illustrates the display of a user interface associated with sponsoring land or gifting land based on square meters.

One embodiment may provide the opportunity for a user to sponsor land preservation or gift land preservation to others in an incremental, affordable manner. Purchase options may range from one time to ongoing monthly support. Each amount purchased may secure a segment of land for preservation. An online newsletter may be provided to members to communicate progress with the initiative and share stories of contributions by that user and other users. One benefit of the invention is the ability to receive product offers and promotions from corporations that lead to sponsorship of land. For example, a corporation may reward a user's sponsorship of land by offering a promotion related to a product/service (e.g., a discounted or free cup of coffee at Starbucks). FIG. 8 illustrates the display of a user interface in association with sponsoring land or gifting land based on square meters.

Activation of Sponsorship Based on Purchase of Product/Service

When a user purchases a product/service, a meter of rain forest may be electronically reserved for preservation/sponsorship in the user's name. To activate the rainforest parcel sponsorship, the consumer may log onto a landing page (e.g., a corporation landing page hosted by the sponsorship platform 140 or a corporation website hosted by a third party platform 130). Log-in credentials may include Facebook or Twitter user name/password.

Upon logging in, the user may enter a unique activation/registration code provided on the product receipt, on a tag attached to the product or on the product itself. Entry of the code may identify a parcel of land or may prompt the user to identify a parcel of land. Either way, the user is then linked to a newly sponsored area of rainforest (e.g., data indicating such is stored in database 144). The user may then attach and post their name and photo to their sponsored rainforest parcel, and the name and photo can then appear on an interactive map showing the parcel of land and other parcels of land.

One unique feature of this embodiment provides users with the option to send a viral message to friends/followers using Facebook or Twitter, promoting the brands/products/services which support a particular cause. An example tweet or post may include: "I just bought X product and saved a meter of rainforest—please join me in this important cause and help support the effort." The social influence marketing aspect may motivate friends and followers to learn more, support the brand, and join the cause.

Figure 9:
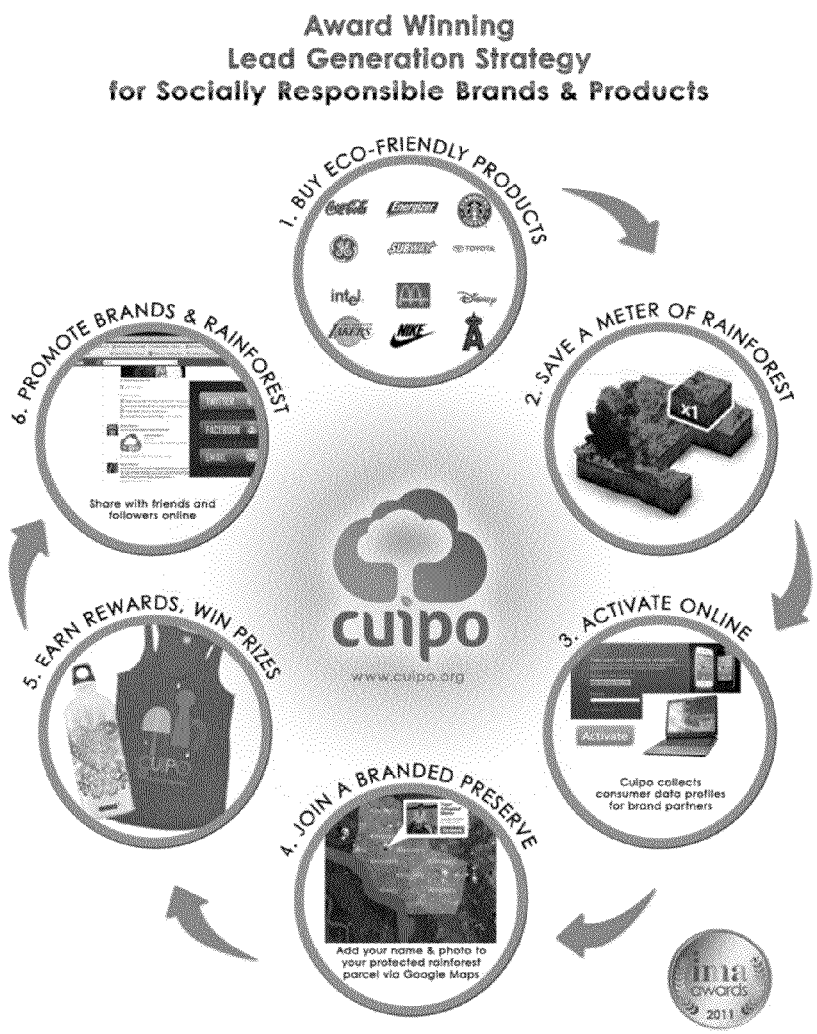
FIG. 9 illustrates a lead generation and product activation cycle in accordance with at least one embodiment of the invention.

Users can be further incentivized to promote products and brands online with friends by entering their name into a drawing for a chance to win a prize (e.g., iPad or free product) each time they complete the cycle illustrated in FIG. 9 (e.g., buy product, sponsor rainforest, promote online). Fanatical "green" users can also compete against each other to preserve greater tracts of rainforest and win a reward, prize, or otherwise gain recognition.

At the end of the product activation experience shown in FIG. 9, the user may receive an electronic "thank you" from the corporation as well as an official sponsorship certificate which includes an actual rainforest parcel number assigned to the sponsored parcel of land. User data may be collected and stored to share with the specific corporate partner that sold the product/service to the user.

Interactive Map

Figure 10:
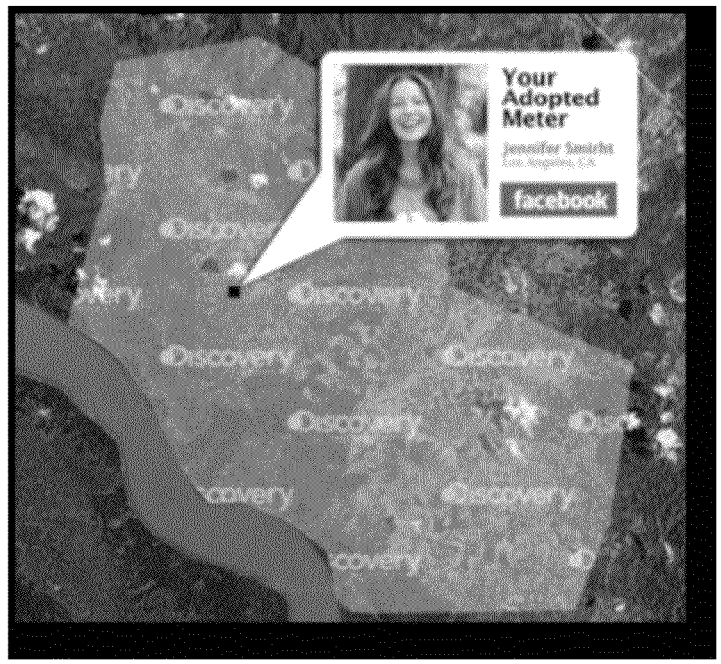
FIG. 10 illustrates an interactive map indicating user sponsorship, demarcation and user identification.

One embodiment may also provide users with an interactive map of the sponsored rainforest or other cause. Google Map functionality may be incorporated to deliver satellite photo images identifying areas that are preserved, areas that are sponsored and areas that are not sponsored. In addition, users may be able to associate their membership profile or social networking profile with their sponsored area on the interactive map, and may associate their profile photo with the area on the map. Friends and family may then be allowed to view a user's philanthropic activities. FIG. 10 illustrates an interactive map indicating user sponsorship, demarcation and user identification.

Figure 11:
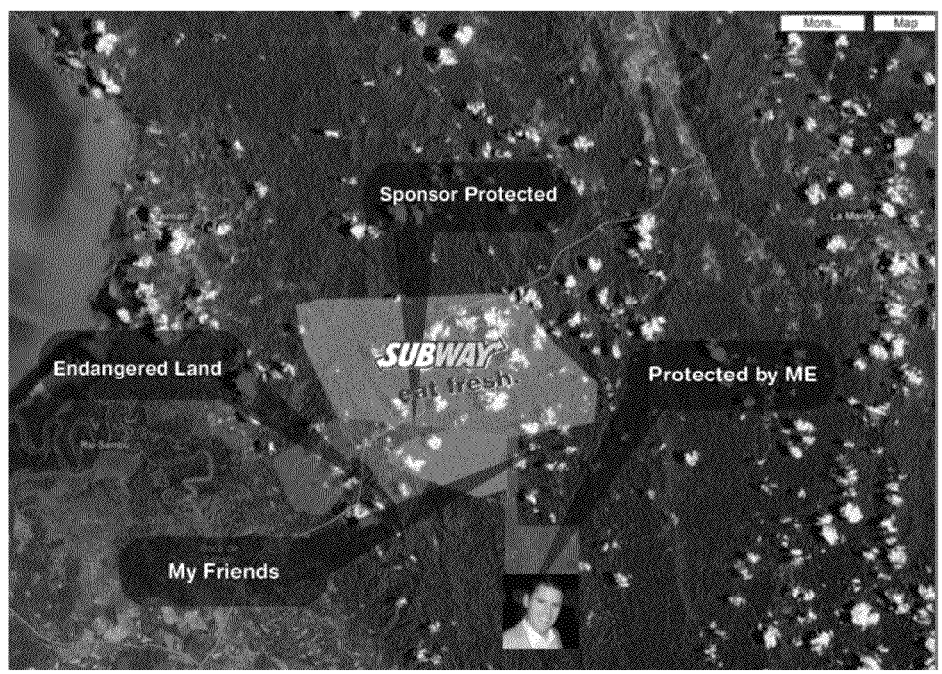
FIG. 11 illustrates an interactive map indicating corporate sponsorship, demarcation and brand identification.

Corporations and brands may also be able to sponsor portions of a preserve. These segments may be larger than an individual sponsor's segments and may include demarcation in the interactive map in addition to brand identification. A sponsor such as Discovery, for example, may be able to waive their corporate flag or other image over a large portion of the sponsored land. All users on the website who view the map may see each sponsor's logo. A list of top ten corporate sponsors may also be provided to all users. FIG. 11 illustrates an interactive map indicating corporate sponsorship, demarcation and brand identification.

Avatar

Each user may be able to customize a user profile which may be viewable by other members in the community. The profile may use a member's photo or simply a name or organization title to identify it. In one embodiment, the user profile may be able to create a custom avatar used to identify the user. The avatar may be used to mark sponsored areas of the map and may identify the user in related games or online forums. The avatar may be customizable in a number of ways (e.g., name, face, clothes.

Club Membership

Another feature of the invention may be a club membership offered to users of the system. A user may be able to make a tangible contribution of expanding their preserve by sponsoring areas periodically or at predefined intervals (e.g., one meter each month). Club memberships may also include additional benefits such as product offers and promotions from corporate sponsors. Program sponsorships may be secured from brands and organizations seeking to support a good cause and possibly improve brand image and attract more business. Each month a new product sponsor may have the opportunity to sponsor and receive product activation for the members. In this way, brands may be provided with both product activation and also a philanthropic branding tool.

Another club membership benefit for users may be the periodic publication of newsletters, accessible online or otherwise, which may communicate progress with sponsorship initiatives and share stories of contributions and their impacts. The newsletters may be used to keep in touch with a broad user base and keep the members involved in organizational matters. The newsletters may also incorporate educational materials, information regarding related sponsorship opportunities, and advertisements.

Club members may also have access to several features which allow members to interact with both members and non-members in various ways. One example feature may include environmental greeting cards that can be sent by a user to any other person informing them of the deterioration of the rainforest and inviting them to involve themselves in Meter at a Time to help preserve a precious resource. Another example feature may be polls available to members to assimilate information concerning user's goals, interest, and suggestions for improving the service.

Green Education

Yet another feature of the invention includes providing education content on the website for visitors. The content may be targeted for two primary audiences, adults and children. Children's content may be fun and entertaining and include subjects that explore the environment and the animal characters that inhabit the rainforest. Adult audience members may find content which may be educational and inspirational, including information on how to adopt energy conservation strategies in the home and in daily life. Portions of this content may be provided by corporate sponsors with both brand integration as well as pre-roll and post-roll advertising spots.

The platforms described herein may offer schools the opportunity to enhance curriculum, foster awareness, and strengthen ties within the community. The embodiments described herein may be transferable amongst various school districts, be self-sustaining from a capital perspective, and integrate into current lesson plans.

Figure 12:
FIG. 12 illustrates the display of a user interface for providing and receiving information regarding green education.

One example of educational content is a carbon footprint calculator or similar means for quantifying action or impact. A carbon footprint calculator may take input from the user and display a total amount of energy the user is using as well as displaying an amount which the user could probably cut from their footprint. Carbon footprint calculations, as well as user pledges to perform activities supporting a particular cause, may be rewarded with corporate coupons or virtual goods. In one embodiment, a sponsored cause relates to purchasing credits to "offset" a user's carbon footprint. These tools may help raise awareness of a particular cause as well as increasing sponsorship revenue. FIG. 12 illustrates the display of a user interface for providing and receiving information regarding green education.

Online Games and Virtual Goods

Yet another feature of the invention may include online games which users may engage in, possibly earning virtual goods or promotional offers from corporate sponsors. Games employed may be casual and designed for short duration, leveraging high-frequency and brief visits. The games may be free to play with revenue generated through virtual goods and advertisements. For example, a conservation-based game may be employed on a user's preserve on the interactive map. A user may be able to farm or explore the various plant and animal life typically found in the represented rainforest. Further, the user may be able to interactive with other users who have sponsored near-by tracts of the interactive map or with virtual players like governments. These features may make the land sponsorship experience come alive, especially for young people.

Leader Board

Yet another feature of the invention may employ a leader board to foster competitive spirit towards land sponsorship. This may highlight personal sponsorship as well as influence preservation footprint. Example categories of the leader board may include sponsored area, pledges towards conservation activities, and number of other users a particular user has invited to join. Users may be able to see other users' sponsorship activity as well as their own in comparison. This may drive campaign participation by cultivating healthy competition.

Advertising and Marketing

Advertising and marketing strategies may vary depending on the sponsorship activities and the target market. For example, corporation advertisements may be placed on webpages (e.g., as a banner, interactive advertisement or other advertisement), and the value of those advertisements may be tracked using various methods (e.g., cost-per-impression(s), cost-per-click(s), cost-per-action). In another example, user information, including user profile information (e.g., gender, age, geography, income, education level, dependents and other demographic information), sponsorship activities, and/or web-browsing behavior, may be used to provide targeted, content-specific advertisements to users based on that user information. By monitoring a user's web-browsing behavior, targeted advertisements based on that behavior may be displayed.

Another feature of the invention may include real-time analytics and reporting. For example, statistics and analytics tools may offer campaign reports via excel or csv, and may include conversion tracking (e.g., standard click to conversion tracking and post-view click and conversion tracking that allows sponsors to assign a value to the users that viewed an advertisement, did not click on it or take some action associated with it, and/or returned to the site via direct navigation or a search query).

Contest

Corporations can provide rewards for users who enter "Green" contests. An example contest may include a science fair. Sponsors can donate funds to create a science project. An online instructional page, instructional videos, and downloadable materials may be made available through the sponsorship platform 140 and/or another platform 120-130. Users may enter the contest by selecting from a library of projects and starting their project, which may be tracked over time, and information regarding the project may be available to other users. A project may be cross-posted on a user's social network page (e.g., on the user's Facebook wall through Facebook connect 3).

Figure 13:
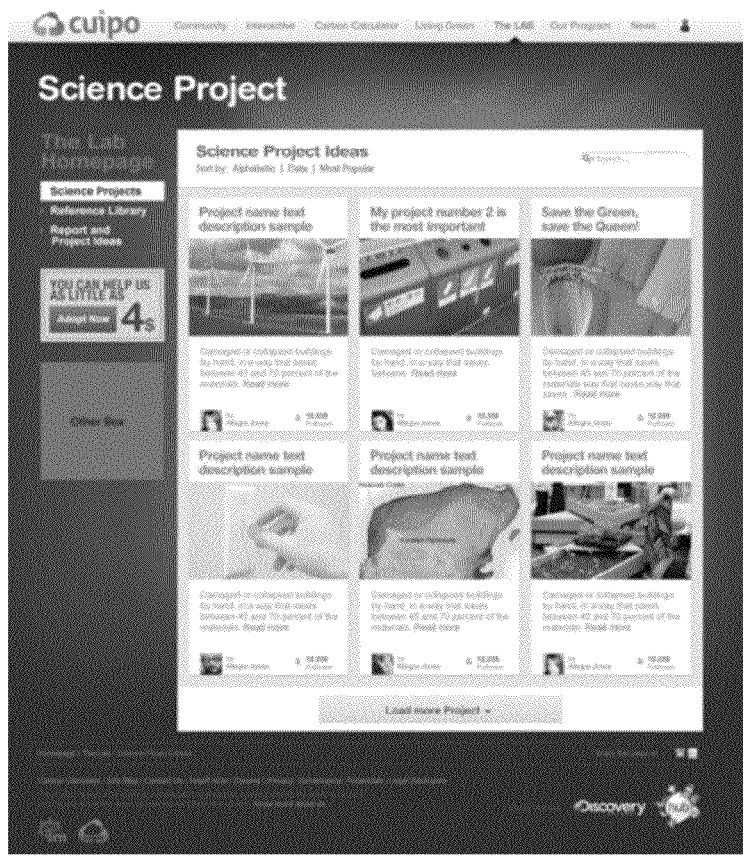
FIG. 13 illustrates a displayed interface for providing science project ideas associated with a science fair contest or other green education initiatives.

Users may have the option to create a promotional webcam video to promote their project for a vote by other users, and can upload pictures of their project development as it progresses. Each time a user updates the project status, a user feed may be provided to other users. Other users may comment on a project, and may score a project. Other inputs may lead to a total score that results in some action regarding the project (e.g., it receives funding, is presented on a webpage, receives a reward from a corporation sponsoring the contest, receives other recognition). FIG. 13 illustrates a displayed interface for providing science project ideas in association with science fair projects or other green education initiatives.

Marketing Strategies

Several marketing strategies may be employed in accordance with certain embodiments of the invention. For example, features of the invention may provide widgets that integrate with a third party website. In another example, e-greeting cards may be selected by a user and sent to others. In yet another example, organizations may fundraise by selling or otherwise promoting sponsorship of land while receiving profit from those fundraising efforts.

Figure 14:
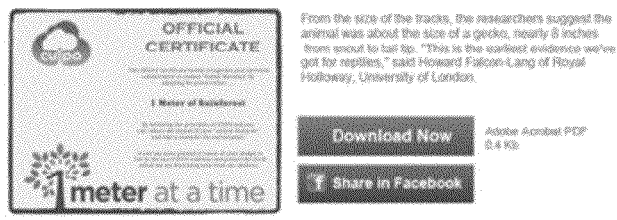
FIG. 14 illustrates an interface for displaying a selection of possible coupons to a user.
Figure 14:
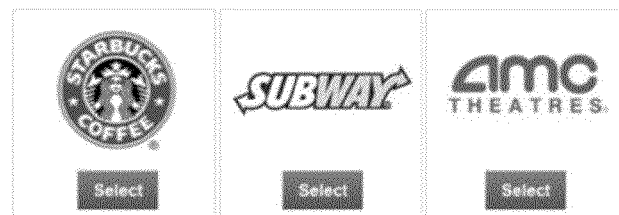

Another feature, as previously described, may be to provide coupons as rewards for users who sponsor a meter of the rainforest. FIG. 14, for example, illustrates an interface for displaying possible coupons to a user. Coupons may also be available for users who track their good "green" behavior, provide a certain number of tweeted impressions, post to the user's social network profile, and cause others to sponsor an area of land.

By way of example, a corporation may provide all land sponsors a coupon for a free product/service. When a user sponsors one meter of the rain forest for preservation, the user may receive the coupon, or an offer to receive the coupon, in their land sponsor receipt at the end of the shopping cart checkout process. If the user clicks on the coupon or a link associated with the coupon, the user may arrive at a landing page for the corporation on the corporation's website or a website hosted by the sponsorship platform 140. When the user opts into the corporation's preservation campaign by clicking 'Agree' to certain terms and conditions regarding that preservation campaign, the user may be presented with a coupon that can be printed off or downloaded to a mobile device for later physical or virtual redemption. Terms and conditions may enable the sponsorship platform 140 or the corporation to track the user's web browsing activity for advertisement placement.

Acquisition of Land

Land that can be sponsored may be acquired using various techniques. For example, prospective land may be analyzed based on various criteria: whether it is free of encumbrances (e.g., titled, ownership recognized by the local government, a fee simple ownership, free of leases, free of oil/mineral/timber/other rights to other parties); meets environmental conditions (e.g., is 90% rainforest, needs reforestation, or is otherwise at risk); and whether the land is already preserved.

Transfer of Land

A particular embodiment of the invention may be configured to facilitate transfer of an area of sponsored land to a specified entity. The specification of an entity may be made based on input received from users (e.g., user selection of the entity). For example, in one implementation, the sponsored land may be transferred to a non-profit land preservation entity. In addition to being sponsored by a user or by a corporate entity, the area may have an "open" registration wherein the entity to take responsibility for the preservation may be named at a later date. Transfer may be based on receiving enough sponsors to meet a pre-determined cost basis for buying and maintaining the sponsored area. For example, a user may choose to view and ultimately sponsor land in a given area and targeted to be transferred to a preferred land preservation entity. As part of the transfer process, the sponsorship module 145A may be configured to transmit/receive data to/from a third party land preservation entity.

Certain embodiments described above relate to sponsorship of land. One of skill in the art may appreciate that various causes can be "sponsored" (i.e., supported with financial contributions, time contributions).

It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In accordance with certain aspects of the present invention, one or more of the process steps described herein may be stored in memory as computer program instructions. These instructions may be executed by a digital signal processor, an analog signal processor, and/or another processor, to perform the methods described herein. Further, the processor(s), the memory, the instructions stored therein, or a combination thereof may serve as a means for performing one or more of the method steps described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the invention.

Aspects of the present invention are typically carried out in or resident on a computing network. The computing network generally includes computer hardware components such as servers, monitors, I/O devices, network connection devices, as well as other associated hardware. In addition, the aspects and features described below may include one or more application programs configured to receive, convert, process, store, retrieve, transfer and/or export data and other content and information. As an example, these aspects and features may include one or more processors that may be coupled to a memory space comprising SRAM, DRAM, Flash and/or other physical memory devices. Memory space may be configured to store an operating system (OS), one or more application programs, such as a UI program, data associated with the pertinent aspect or feature, applications running on processors in the device, user information, or other data or content. The various aspects and features of the present invention may further include one or more User I/O interfaces, such as keypads, touch screen inputs, mice, Bluetooth devices or other I/O devices. In addition, the certain aspects and features may include a cellular or other over the air wireless carrier interface, as well as a network interface that may be configured to communicate via a LAN or wireless LAN (WiLAN), such as a Wi-Fi network. Other interfaces, such as USB or other wired interfaces may also be included.

As used herein, computer program products comprising computer-readable media including all forms of computer-readable medium except, to the extent that such media is deemed to be non-statutory, transitory propagating signals.

While various embodiments of the present invention have been described in detail, it may be apparent to those skilled in the art that the present invention can be embodied in various other forms not specifically described herein. Therefore, the protection afforded the present invention should only be limited in accordance with the following claims.

We claim:

1. A computer-implemented method for sponsoring an area of land, comprising:

storing, at a database, information identifying a plurality of areas of land, a first indication reflecting that a first area of land is sponsored, a second indication that a second area of land is unsponsored, and a third indication that a third area of land is unsponsored;

storing one or more indications that a first user has pledged to preserve the second area of land and the third area of land;

storing data specifying a first activation code associated with a first product or service offered by the first user and further associated with the second area of land and the third area of land;

receiving the first activation code, from a remote computing device, from a second user who purchased the first product or service from the first user;

receiving input, from a remote computing device, identifying the second area of land from the second user who purchased the first product or service from the first user wherein the input specifies a selection of the second area of land from among the second area of land and the third area of land;

modifying, based on the input and the first activation code, the second indication to reflect that the second area of land is sponsored in the second user's name; and causing, after the modifying the second indication, the remote computing device to display an updated map showing the plurality of areas of land, the first indication reflecting that the first area of land is sponsored, the second indication that the second area of land is sponsored in the second user's name, and the third indication that the third area of land is unsponsored.

2. The computer-implemented method of claim 1, further comprising:
storing data specifying a second activation code associated with a second product or service offered by the first user and further associated with the second area of land; and
storing data specifying a third activation code associated with a third product or service offered by the first user and further associated with the third area of land.

3. The computer-implemented method of claim 2, further comprising:
receiving the input identifying the second area of land from a second user who purchased the second product or service from the first user, wherein the input specifies the second activation code;
receiving additional input identifying the third area of land from a third user who purchased the third product or service from the first user, wherein the additional input specifies the third activation code;
modifying, based on the input, the second indication to reflect that the second area of land is sponsored in the second user's name; and
modifying, based on the additional input, the third indication to reflect that the third area of land is sponsored in the third user's name.

4. The computer-implemented method of claim 2, further comprising: providing the first activation code to the first user; and providing direction to the first user instructing the first user to include the first activation code on a tag attached to the first product or service.

5. The computer-implemented method of claim 1, wherein the remote computing device is a point-of-sale device.

6. The computer-implemented method of claim 1, further comprising: causing, prior to the receiving input identifying the second area of land, the remote computing device to display an initial map showing the plurality of areas of land, the first indication reflecting that the first area of land is sponsored, the second indication that the second area of land is unsponsored, and the third indication that the third area of land is unsponsored.

7. The computer-implemented method of claim 6, further comprising: receiving data that identifies a social networking message relating to the second area of land.

8. The computer-implemented method of claim 1, further comprising:
causing, after receiving the input, a first transmission of a first electronic message from the first user to the second user, wherein the first electronic message includes first information associated with the second area of land; and
causing, after receiving the input, a second transmission of a second electronic message from the second user to a plurality of individuals associated with the second user, wherein the second electronic message includes second information associated with the second user's sponsorship of the second area of land.

9. A system for sponsoring an area of land, the system comprising: a computer configured to:
store, at a database, information identifying a plurality of areas of land, a first indication reflecting that a first area of land is sponsored, a second indication that a second area of land is unsponsored, and a third indication that a third area of land is unsponsored;
store, at the database, one or more indications that a first user has pledged to preserve the second area of land and the third area of land;
store, at the database, data specifying a first activation code associated with a first product or service offered by the first user and further associated with the second area of land and the third area of land;
receive the first activation code, from a remote computing device, from a second user who purchased the first product or service from the first user;
receive input, from a remote computing device, identifying the second area of land from the second user who purchased the first product or service from the first user wherein the input specifies a selection of the second area of land from among the second area of land and the third area of land;
modify, based on the input and the first activation code, the second indication to reflect that the second area of land is sponsored in the second user's name; and
causing, after the modifying the second indication, the remote computing device to display an updated map showing the plurality of areas of land, the first indication reflecting that the first area of land is sponsored, the second indication that the second area of land is sponsored in the second user's name, and the third indication that the third area of land is unsponsored.

10. The system of claim 9, wherein the remote computing device is a point-of-sale device.

11. The system of claim 9, wherein the computer is further configured to:
cause, prior to receiving input identifying the second area of land, the remote computing device to display an initial map showing the plurality of areas of land, the first indication reflecting that the first area of land is sponsored, information identifying a first sponsor of the first area of land, the second indication that the second area of land is unsponsored, and the third indication that the third area of land is unsponsored.

12. The system of claim 11, wherein the computer is further configured to:
receive data that identifies a social networking message relating to the second area of land.

13. The system of claim 9, wherein the computer is further configured to: store data specifying a second activation code associated with a second product or service offered by the first user and further associated with the second area of land; and storing data specifying a third activation code associated with a third product or service offered by the first user and further associated with the third area of land.

14. The system of claim 13, wherein the computer is further configured to:
receive the input identifying the second area of land from a second user who purchased the second product or service from the first user, wherein the input specifies the second activation code;
receive additional input identifying the third area of land from a third user who purchased the third product or service from the first user, wherein the additional input specifies the third activation code;
modify, based on the input, the second indication to reflect that the second area of land is sponsored in the second user's name; and
modify, based on the additional input, the third indication to reflect that the third area of land is sponsored in the third user's name.

15. The system of claim 9, wherein the computer is further configured to:
- cause, after receiving the input, a first transmission of a first electronic message from the first user to the second user, wherein the first electronic message includes first information associated with the second area of land; and
- cause, after receiving the input, a second transmission of a second electronic message from the second user to a plurality of individuals associated with the second user, wherein the second electronic message includes second information associated with the second user's sponsorship of the second area of land.

16. A computer program product comprising a computer usable non-transitory medium having a computer readable program code embodied therein, said computer readable program code adapted to be executed to implement a method for sponsoring an area of land, the method comprising:
- storing, at a database, information identifying a plurality of areas of land, a first indication reflecting that a first area of land is sponsored, a second indication that a second area of land is unsponsored, and a third indication that a third area of land is unsponsored;
- storing one or more indications that a first user has pledged to preserve the second area of land and the third area of land;
- storing data specifying a first activation code associated with a first product or service offered by the first user and further associated with the second area of land and the third area of land;
- receiving the first activation code, from a remote computing device, from a second user who purchased the first product or service from the first user;
- receiving input, from a remote computing device, identifying the second area of land from the second user who purchased the first product or service from the first user wherein the input specifies a selection of the second area of land from among the second area of land and the third area of land;
- modifying, based on the input and the first activation code, the second indication to reflect that the second area of land is sponsored in the second user's name; and
- causing, after the modifying the second indication, the remote computing device to display an updated map showing the plurality of areas of land, the first indication reflecting that the first area of land is sponsored, the second indication that the second area of land is sponsored in the second user's name, and the third indication that the third area of land is unsponsored.

17. The computer program product of claim 16, the method further comprising: causing, prior to the receiving input identifying the second area of land, the remote computing device to display an initial map showing the plurality of areas of land, information identifying a corporate sponsor of the plurality of areas of land, the first indication reflecting that the first area of land is sponsored, the second indication that the second area of land is unsponsored, and the third indication that the third area of land is unsponsored.

18. The computer program product of claim 16, the method further comprising: storing data specifying a second activation code associated with a second product or service offered by the first user and further associated with the second area of land; and storing data specifying a third activation code associated with a third product or service offered by the first user and further associated with the third area of land.

19. The computer program product of claim 18, further comprising: receiving the input identifying the second area of land from a second user who purchased the second product or service from the first user, wherein the input specifies the second activation code; receiving additional input identifying the third area of land from a third user who purchased the third product or service from the first user, wherein the additional input specifies the third activation code; modifying, based on the input, the second indication to reflect that the second area of land is sponsored in the second user's name; and modifying, based on the additional input, the third indication to reflect that the third area of land is sponsored in the third user's name.

20. The computer program product of claim 16, the method further comprising:
- receiving data that identifies a social networking message relating to the second area of land.

\* \* \* \* \*